UNITED STATES PATENT OFFICE.

WM. M. WELLING, OF NEW YORK, N. Y.

IMPROVEMENT IN FACTITIOUS IVORY.

Specification forming part of Letters Patent No. 17,949, dated August 4, 1857.

*To all whom it may concern:*

Be it known that I, WILLIAM M. WELLING, of the city, county, and State of New York, have invented, made, and applied to use a certain new and useful Improvement in Composition for Artificial Ivory; and I do hereby declare that the following is a full, clear, and exact description of the method of compounding and mixing the said compositions.

To make white artificial ivory I use the following composition in about the proportion specified: white shellac, ten ounces; impalpable white, (acetate of lead precipitated by sulphuric acid,) four and one half-ounces; ivory-dust, eight ounces; camphor, five ounces.

To make a light-red artificial ivory I use the following composition in about the proportion specified: shellac, eight and one-half ounces; impalpable white, three ounces; ivory-dust, eight ounces; camphor, five ounces; vermilion, one and one-half ounce.

To make a dark-red artificial ivory I use the following composition in about the proportion specified: shellac, eight and one-half ounces; impalpable white, two and one-half ounces; ivory-dust, previously boiled in cochineal, nine and one-half ounces; camphor, five ounces; vermilion, one and one-half ounce.

From the foregoing proportions of ingredients for different colors of artificial ivory it will be perceived that shellac, ivory-dust, and camphor are the bases of my composition, and the other ingredients merely act to give color to the same, and other colors could be produced by introducing various pigments. My invention therefore consists in making artificial ivory by the use of shellac, ivory-dust, (or its equivalent,) and camphor combined together by the operation of heat in substantially the following manner: I reduce the shellac to the form of a powder and heat the other ingredients also in a finely-powdered state. I then mix the various ingredients together and expose them in a suitable vessel to the operation of heat and stirring or mixing. For this purpose I find that a vessel heated by steam under pressure is preferable, and said heat should be about 240° to 280°, and the stirring can be performed by rotary scrapers or fingers, and I prefer that the other ingredients be heated and mixed before the camphor is introduced. When the masses are thus thoroughly heated and mixed, which requires from fifteen to forty minutes, I remove the same from the vessel and roll the mass between suitable rollers heated by steam or otherwise to the desired temperature—say about 240° to 280°—and when the composition is thoroughly mixed and worked together I cut the same out while hot by suitable dies, or form the same up into any shape that may be required by any competent means. If the composition after being rolled is laid away to cool, it will be necessary again to heat it by laying it on a plate heated by steam or equivalent means.

Billiard-balls, piano-keys, and similar articles that cannot now be made of fine ivory except at great cost, can, by my artificial ivory, be made at comparatively little cost and in such a manner that articles are scarcely distinguishable from those of natural ivory.

What I claim as my invention, and desire to secure by Letters Patent, is—

Forming artificial ivory by thoroughly mixing and combining the articles specified, or others having equivalent properties while under the operation of heat, substantially as specified.

In witness thereof I have hereunto set my signature this 27th day of June, 1857.

WM. M. WELLING.

Witnesses:
LEMUEL W. SERRELL,
CHARLES PERLEY.